United States Patent [19]

Itoh et al.

[11] 3,929,753

[45] Dec. 30, 1975

[54] METHOD FOR PRODUCING HIGH BULK DENSITY POLYVINYL CHLORIDE

[75] Inventors: Iko Itoh; Takeshi Sekihara; Tomoyuki Emura, all of Niihama, Japan

[73] Assignee: Sumitomo Chemical Company, Limited, Osaka, Japan

[22] Filed: Nov. 13, 1973

[21] Appl. No.: 415,358

[30] Foreign Application Priority Data

Nov. 21, 1972 Japan.............................. 47-117449

[52] U.S. Cl.. 260/92.8 W; 260/29.6 WA; 260/86.3; 260/87.1; 260/87.5 C; 260/87.5 G; 260/87.5 R; 260/78.5 CL
[51] Int. Cl..................... C08f 114/02; C08f 114/16
[58] Field of Search..260/92.8 W, 29.6 WA, 78.5 CL, 260/87.1, 87.5 C, 87.5 R, 86.3, 87.5 G

[56] References Cited
UNITED STATES PATENTS

| | | | |
|---|---|---|---|
| 2,812,318 | 11/1957 | Kreager et al. | 260/92.8 W |
| 3,047,534 | 7/1962 | Dyer et al. | 260/880 X |
| 3,055,876 | 9/1962 | Grotz | 260/92.8 W X |
| 3,161,623 | 12/1964 | Kuhne | 260/92.8 W |
| 3,172,877 | 3/1965 | Fishbein et al. | 260/87.1 |
| 3,228,919 | 1/1966 | Gatta et al. | 260/85.5 |
| 3,298,987 | 1/1967 | Colgan et al. | 260/29.6 WA |
| 3,459,719 | 8/1969 | Richardson et al. | 260/92.8 W X |
| 3,544,539 | 12/1970 | Koyanagi et al. | 260/92.8 W |
| 3,706,705 | 12/1972 | Koyanagi et al. | 260/78.5 CL |

*Primary Examiner*—Joseph L. Schofer
*Assistant Examiner*—Herbert J. Lilling
*Attorney, Agent, or Firm*—Stewart and Kolasch, Ltd.

[57] ABSTRACT

A method for producing polyvinyl chloride having a high bulk density, superior gelling property and superior processability by suspension polymerization of vinyl chloride monomer or a mixture of predominantly vinyl chloride and at least one monomer copolymerizable therewith in the presence of an oil soluble catalyst, wherein the polymerization reaction is initiated in the presence of a partially saponified polyvinyl alcohol having 70 to 80 mol % of saponification degree and 500 to 900 of average degree of polymerization as a suspension stabilizer, and when the polymerization conversion becomes 3 to 40 % by weight, a partially saponified polyvinyl alcohol having 75 to 95 mol % of saponification degree and 1000 or more of average degree of polymerization is added to the polymerization system.

8 Claims, No Drawings

METHOD FOR PRODUCING HIGH BULK DENSITY POLYVINYL CHLORIDE

The present invention relates to a method for producing polyvinyl chloride. More particularly, it relates to a method for producing polyvinyl chloride having high bulk density, superior gelling property and superior processability by suspension polymerization of vinyl chloride monomer alone or a mixture of predominantly vinyl chloride and a monomer copolymerizable therewith, which is characterized in that the polymerization is initiated in the presence of a partially saponified polyvinyl alcohol having low molecular weight as a suspension stabilizer and further during the course of the polymerization there is added thereto a partially saponified polyvinyl alcohol having high molecular weight.

Polyvinyl chloride has been widely used in the fields of soft or rigid products in accordance with its superior mechanical property, incombustibility and chemical resistance. Particularly, the demand for rigid extrusion products such as pipe and corrugated board has been increasing.

For rigid extrusion processing of polyvinyl chloride, it is preferable to increase the extrusion rate since the productivity rises in proportion to the increase of extrusion rate. It has been known that the extrusion rate depends on the bulk density of polyvinyl chloride and it can be increased when the bulk density is higher. It has also been known that in the rigid extrusion processing of polyvinyl chloride the quality of the extrusion product, for instance, the appearance and strength thereof are affected by the gelling property of polyvinyl chloride.

It has, hitherto, been known to use a water soluble synthetic high molecular weight compound such as a partially saponified polyvinyl alcohol, various cellulose derivatives or vinyl acetatemaleic anhydride copolymer, or a water soluble natural high molecular weight compound in the suspension polymerization of vinyl chloride monomer. However, according to the known method using such suspension stabilizer, there has never been produced any polyvinyl chloride having both a high bulk density and a superior gelling property. That is, when the polyvinyl chloride has a good gelling property, it has a low bulk density, and on the other hand, when it has a high bulk density, it is inferior in gelling property. Thus, it has hitherto been strongly desired to develop a polyvinyl chloride having superior processability for the purpose of raising the productivity of the polyvinyl chloride product without lowering the quality of the product in the processing step.

Under the circumstances, studies have been made to find out a method for producing polyvinyl chloride having a high bulk density, superior gelling property and superior processability, and, it has now been found that the desired polyvinyl chloride can be produced by initiating the suspension polymerization in the presence of a partially saponified polyvinyl alcohol having low molecular weight and further adding a partially saponified polyvinyl alcohol having high molecular weight to the polymerization system during the course of the polymerization reaction.

According to the present invention, vinyl chloride monomer alone or a mixture of predominantly vinyl chloride and a monomer copolymerizable therewith may be suspension-polymerized in the presence of an oil soluble catalyst, in which the polymerization is initiated in the presence of 0.01 to 0.2 part by weight (on the basis of 100 parts by weight of the monomer) of a partially saponified polyvinyl alcohol having 70 to 80 mol % of saponification degree and 500 to 900 of average degree of polymerization as a suspension stabilizer and when the polymerization conversion becomes 3 to 40 % by weight, a partially saponified polyvinyl alcohol having 75 to 95 mol % of saponification degree and 1000 or more of average degree of polymerization is added to the polymerization system, and thereby the desired polyvinyl chloride having a high bulk density, superior gelling property and superior processability is produced.

The partially saponified polyvinyl alcohol having low molecular weight, which is previously added to the polymerization system, has 70 to 80 mol % of saponification degree and 500 to 900 of average degree of polymerization. When the partially saponified polyvinyl alcohol has more than 80 mol % of saponification degree and more than 900 of average degree of polymerization, the produced polyvinyl chloride shows inferior gelling property, and on the other hand, when it has less than 70 mol % of saponification degree and less than 500 of average degree of polymerization, coarse particles are disadvantageously produced. The partially saponified polyvinyl alcohol having low molecular weight may be used in an amount of 0.01 to 0.2, preferably 0.02 to 0.1 part by weight on the basis of 100 parts by weight of the feed monomer. When the amount is less than 0.01 part by weight, coarse particles are produced, and on the other hand, when the amount is more than 0.2 part by weight, the bulk density of the product is low.

The partially saponified polyvinyl alcohol having high molecular weight, which is added during the course of the polymerization, has 75 to 95 mol % of saponification degree and 1000 or more, preferably 1000 to 3000 of average degree of polymerization. When it has more than 95 mol % of saponification degree, coarse particles are produced, and on the other hand, when it has less than 75 mol % of saponification degree and less than 1000 of average degree of polymerization, the bulk density of the product can not be improved.

The partially saponified polyvinyl alcohol may be used in an amount of 0.01 or more, preferably 0.02 to 0.2 part by weight on the basis of 100 parts by weight of the feed monomer. When the amount is less than 0.01 part by weight, the bulk density of the product is disadvantageously low. The partially saponified polyvinyl alcohol having low molecular weight and that having high molecular weight may be preferably used in a ratio of 1 : 10 to 10 : 1 (ratio by weight), and the total amount of both may be in a range of 0.03 to 0.3 part by weight on the basis of 100 parts by weight of the feed monomer.

The partially saponified polyvinyl alcohol having high molecular weight may be added to the polymerization system when the polymerization conversion is in a range of 3 to 40 % by weight. When the partially saponified polyvinyl alcohol having high molecular weight is added prior to the polymerization reaction, or before the polymerization conversion reaches 3 % by weight, or after the polymerization conversion is over 40 % by weight, the bulk density of the product can not be improved. The partially saponified polyvinyl alcohol having high molecular weight may be added at one time, stepwise, or continuously.

Thus, according to the present invention, the desired polyvinyl chloride having a high bulk density, superior gelling property and superior processability can be produced by using two kinds of partially saponified polyvinyl alcohol having a specific saponification degree and a specific degree of polymerization in a specific order of addition. When any one of these conditions is missing, the desired improvement of the property of the product can not be achieved.

The polymerization catalyst used in the present invention may be any conventional oil soluble catalyst which is usually used in suspension polymerization of vinyl chloride monomer. The suitable examples of the oil soluble catalyst may be lauroyl peroxide, t-butyl peroxypivalate, diisopropyl peroxydicarbonate, di-sec.-butyl peroxydicarbonate, azobisisobutyronitrile, azobis(2,4-dimethylvaleronitrile), azobis(2,4-dimethyl-4-methoxyvaleronitrile), or a mixture thereof, but is not limited thereto. The polymerization catalyst may be used in an amount usually used in the conventional suspension polymerization, and generally in a range of 0.005 to 1 % by weight on the basis of the weight of the starting monomer.

The proportion of water to the monomer to be polymerized is not restricted to a specific range, but water may be preferably used in a range of 0.8 to 2.0 parts by weight on the basis of one part by weight of the starting monomer. The polymerization reaction may be usually carried out at a temperature of 20° to 70°C.

In the present polymerization reaction, there may be added any other ingredient which does not give any undesirable effect on the reaction, such as a buffer (e.g. sodium bicarbonate or disodium hydrogen phosphate), a molecular weight controlling agent (e.g., trichloroethylene), a cross-linking agent, a stabilizer, or a filler to the polymerization system.

The present method can be applied to either vinyl chloride monomer alone or a mixture of predominantly vinyl chloride and a monomer copolymerizable therewith. The suitable examples of the monomer copolymerizable with vinyl chloride may be ethylene, propylene, vinyl acetate, vinyl propionate, lauryl vinyl ether, isobutyl vinyl ether, methyl acrylate, methyl methacrylate, ethyl acrylate, butyl acrylate, octyl acrylate, or the like, and one or more kinds thereof may be used.

The polyvinyl chloride obtained by the present method has a remarkably higher bulk density and similar gelling property in comparison with the polyvinyl chloride obtained by using a partially saponified polyvinyl alcohol having 70 to 80 mol % of saponification degree and 500 to 900 of average degree of polymerization alone, and further the present polyvinyl chloride has a remarkably superior gelling property and similar bulk density in comparison with the polyvinyl chloride obtained by using a partially saponified polyvinyl alcohol having 75 to 95 mol % of saponification degree and 1000 or more of average degree of polymerization alone. That is, the desired polyvinyl chloride having a high bulk density, superior gelling property and superior processability can be produced only by the present method which is characterized in that the polymerization is initiated in the presence of a partially saponified polyvinyl alcohol having 70 to 80 mol % of saponification degree and 500 to 900 of average degree of polymerization and further where a partially saponified polyvinyl alcohol having 75 to 95 mol % of saponification degree and 1000 or more of average degree of polymerization is added to the polymerization system when the polymerization degree becomes 3 to 40 % by weight.

The method of the present invention can give the desired polyvinyl chloride having a high bulk density and superior gelling property by easier means and therefore it is extremely valuable as an industrial method.

The present invention is illustrated by the following examples but is not limited thereto.

The characteristics of the product shown in the examples were measured by the following methods:

Bulk density: by JIS-K-6721

Distribution of particle size: by JIS-Z-8801

Gelling property: A test material prepared in accordance with the formulation mentioned below was kneaded by a plastograph (Plasticouder PLV 151 type, made by Brabender, West Germany) at 190°C and 50 r.p.m., and then the time until maximum torque was shown was stated as the gelling time. When the gelling time is shorter, the gelling property is better.

Formulation of the test material:

| Polyvinyl chloride | 100 | parts by weight |
|---|---|---|
| Tribase (tribasic lead sulfate) | 2 | " |
| Lead stearate | 1 | " |
| Barium stearate | 0.5 | " |

EXAMPLE 1

Into a 100 liter glass-lined autoclave were added deionized water (40 kg), a 2 % by weight aqueous solution of partially saponified polyvinyl alcohol having 74 mol % of saponification degree and 750 of average degree of polymerization (Gosenol KP-08, made by Nippon Gosei Kagaku Kogyo K.K,; 750 ml) and a 50 % by weight solution of diisopropyl peroxydicarbonate in toluene (9 g). After the autoclave was de-aerated until it became at 50 mmHg to remove oxygen, vinyl chloride monomer (30 kg) was added thereto. The polymerization reaction was initiated by raising the temperature to 57°C with agitation, and when the polymerization conversion became the values shown in Table I, to the polymerization system was added a 2 % by weight aqueous solution of partially saponified polyvinyl alcohol having 80 mol % of saponification degree and 1700 of average degree of polymerization (Gosenol KH-17, made by Nippon Gosei Kagaku Kogyo K.K.; 750 ml), and then the polymerization reaction was carried out.

At the time of initiation of polymerization, the pressure in the autoclave was 8.5 kg/cm$^2$G, but after 10 hours it was 6.5 kg/cm$^2$G. At that time the polymerization reaction was stopped, and the unreacted vinyl chloride monomer was purged, and the content was taken out and dried.

The characteristics of the polymer thus obtained are shown in Table I. The polymerization yield was 85 %, and the average degree of polymerization was 1100.

Table I

| Test No. | Time of addition of partially saponified polyvinyl alcohol having high molecular weight (polymerization conversion %) | Bulk density (g/cc) | Gelling time (minute) | Particle size distribution (% by weight) | | |
|---|---|---|---|---|---|---|
| | | | | 42 mesh pass | 100 mesh pass | 250 mesh pass |
| Comp. 1 | 0 | 0.45 | 4.5 | 99.8 | 12.0 | 0.3 |
| 1 | 5 | 0.54 | 4.5 | 99.2 | 15.8 | 1.2 |
| 2 | 15 | 0.54 | 4.1 | 98.2 | 10.2 | 0.0 |
| 3 | 30 | 0.53 | 4.3 | 97.5 | 9.8 | 0.0 |
| Comp. 2 | 50 | 0.43 | 4.3 | 75.3 | 8.3 | 0.0 |

As made clear from the test results shown in Table I, according to Test Nos. 1, 2 and 3 by the present invention there could be obtained the desired polyvinyl chloride having 0.53 g/cc or more of bulk density and shorter gelling time, and on the other hand, according to Comparative Examples 1 and 2 being out of the range of present invention, there could not be obtained the desired polyvinyl chloride which had a shorter gelling time but had a lower bulk density.

EXAMPLE 2

The polymerization was carried out in the same manner as in Example 1, Test No. 2 excepting that there were used the suspension stabilizers being present at the initiation of polymerization and those added during the course of the polymerization as shown in Table II.

The polymerization yield was 85 %, and the average degree of polymerization was 1100. The characteristics of the polymer thus obtained are shown in Table II.

As made clear from the test results shown in Table II, according to Test Nos. 4 to 9 by the present invention there could be obtained the desired polyvinyl chloride having 0.52 g/cc or more of bulk density and shorter gelling time; according to Comparative Example 3 using a partially saponified polyvinyl alcohol having low molecular weight alone, the bulk density of the product was low; according to Comparative Example 4 using a partially saponified polyvinyl alcohol having high molecular weight alone, the gelling property of the product was inferior; according to Comparative Example 5, in which a partially saponified polyvinyl alcohol having low molecular weight was added in portions, the bulk density was not improved; according to Comparative Example 6, in which the polymerization was initiated in the presence of a partially saponified polyvinyl alcohol having high molecular weight and a partially saponified polyvinyl alcohol having low molecular weight was added during the course of the polymerization, the gelling property of the product was inferior;

Table II

| Test No. | Suspension stabilizer to be added at initiation of polymerization | | | Suspension stabilizer to be added on the way of polymerization | | | Bulk density (g/cc) | Gelling time (minute) | Particle size distribution (% by weight) | | |
|---|---|---|---|---|---|---|---|---|---|---|---|
| | Saponification degree (mol %) | Average degree of polymerization | Addition amount (% by weight to the monomer) | Saponification degree (mol %) | Average degree of polymerization | Addition amount (% by weight to the monomer) | | | 42 mesh pass | 100 mesh pass | 250 mesh pass |
| 4 | 73 | 760$^f$ | 0.05 | 80 | 1700$^a$ | 0.05 | 0.54 | 4.3 | 98.7 | 19.3 | 0.8 |
| 5 | 78 | 730$^h$ | 0.05 | 88 | 2200$^c$ | 0.05 | 0.53 | 5.0 | 98.9 | 16.4 | 0.3 |
| 6 | 72 | 730$^g$ | 0.05 | 80 | 2000$^b$ | 0.05 | 0.55 | 4.0 | 99.5 | 17.8 | 0.0 |
| 7 | 74 | 750$^d$ | 0.10 | 80 | 2000$^b$ | 0.05 | 0.52 | 4.1 | 99.8 | 13.1 | 0.2 |
| 8 | 74 | 750$^d$ | 0.05 | 80 | 2000$^b$ | 0.10 | 0.57 | 5.5 | 99.2 | 15.7 | 0.0 |
| 9 | 73 | 850 | 0.05 | 80 | 1700$^a$ | 0.05 | 0.55 | 4.5 | 99.0 | 17.3 | 0.2 |
| Comp. 3 | 74 | 750$^d$ | 0.15 | — | — | 0 | 0.45 | 4.0 | 95.4 | 16.5 | 0.0 |
| " 4 | 80 | 1700$^a$ | 0.10 | — | — | 0 | 0.53 | 10.3 | 98.2 | 10.2 | 0.3 |
| " 5 | 74 | 750$^d$ | 0.05 | 74 | 750$^d$ | 0.05 | 0.47 | 4.3 | 97.7 | 18.5 | 0.0 |
| " 6 | 80 | 1700$^a$ | 0.05 | 74 | 750$^d$ | 0.05 | 0.53 | 9.5 | 99.3 | 13.0 | 0.1 |
| " 7 | 74 | 750$^d$ | 0.30 | 80 | 1700$^a$ | 0.05 | 0.48 | 5.0 | 99.8 | 19.6 | 0.0 |
| " 8 | 74 | 750$^d$ | 0.005 | 80 | 1700$^a$ | 0.05 | 0.35 | — | 45.3 | 5.9 | 0.0 |
| " 9 | 88 | 550$^e$ | 0.05 | 80 | 1700$^a$ | 0.05 | 0.48 | 10.5 | 81.4 | 20.3 | 1.7 |

(NOTE) The suspension stabilizers mentioned by alphabet in Table II were as follows:
- a) Gosenol KH-17 (made by Nippon Gosei Kagaku Kogyo K.K.)
- b) " KH-20 ( " )
- c) " GH-20 ( " )
- d) " KP-08 ( " )
- e) " GL-05 ( " )
- f) Alcotex 75L (made by Revertex, G.B.)
- g) " 72L ( " )
- h) " 78L ( " )

according to Comparative Examples 7 and 8, in which the addition amount of the partially saponified polyvinyl alcohol having low molecular weight was out of the scope of the present invention, the bulk density of the product was low and crude particles were produced; and according to Comparative Example 9, in which a partially saponified polyvinyl alcohol being out of the range of the present invention was used, the gelling property of the product was inferior.

EXAMPLE 3

Into an autoclave as used in Example 1 were added deionized water (45 kg), a 2 % by weight aqueous solution of partially saponified polyvinyl alcohol having 74 mol % of saponification degree and 750 of average degree of polymerization (Gosenol KP-08, made by Nippon Gosei Kagaku Kogyo K.K.; 750 ml), dilauroyl peroxide (4.5 g) and a 50 % solution of diisopropyl peroxydicarbonate in toluene (9 g). After de-aeration of the autoclave, vinyl chloride monomer (30 kg) and ethylene (450 g) were added thereto. The polymerization reaction was initiated by raising the temperature to 56°C with agitation, and when the polymerization conversion became 15 %, to the polymerization system was added a 2 % by weight aqueous solution of partially saponified polyvinyl alcohol having 80 mol % of saponification degree and 2000 of average degree of polymerization (Gosenol KH-20, made by Nippon Gosei Kagaku Kogyo K.K.; 750 ml), and then the polymerization reaction was carried out.

At the time of initiation of polymerization, the pressure in the autoclave was 11 kg/cm²G, but after 9 hours it was 10 kg/cm²G. At that time the polymerization reaction was stopped, and the unreacted vinyl chloride monomer was purged, and the content was taken out and dried. The characteristics of the copolymer thus obtained are shown in Table III.

As a comparative example, the polymerization reaction was carried out in the same manner as described above excepting that a 2 % by weight aqueous solution of partially saponified polyvinyl alcohol having 80 mol % of saponification degree and 2000 of average degree of polymerization (Gosenol KH-20, made by Nippon Gosei Kagaku Kogyo K.K.; 750 ml) was added prior to the initiation of the polymerization reaction instead of Gosenol KP-08 and no suspension stabilizer was added during the course of polymerization, and thereby a copolymer was obtained. The characteristics of the copolymer thus obtained are also shown in Table III.

r.p.m. by using a twin screw extruder (RC-100 type, made by Ikegai Seisakusho), in which the temperature of the cylinder was 148°C below the hopper, 160°C at the middle of the cylinder and 170°C at the outlet of the cylinder, and the temperature of the die was 185°C at the inlet and 190°C at the outlet. The results are shown in Table IV.

Table IV

| Test No. | Test number of polymer | Bulk density after blending (g/cc) | Extrusion rate (kg/hr) | Appearance of pipe |
|---|---|---|---|---|
| 11 | Test 2 | 0.59 | 20.0 | Good |
| 12 | " 5 | 0.58 | 19.7 | " |
| 13 | " 8 | 0.62 | 20.5 | " |
| Comp. 11 | Comp. 3 | 0.50 | 13.0 | Good |
| Comp. 12 | " 4 | 0.57 | 19.5 | Rough skin, unsufficient gelation |

As made clear from the results shown in Table IV, the polyvinyl chloride obtained by the present method was extremely large in the extrusion rate and the characteristics of the extruded product were superior in comparison with the polyvinyl chloride obtained by the conventional suspension polymerization methods, and therefore it will be understood that the present polyvinyl chloride is industrially useful.

What is claimed is:

1. A method for producing polyvinyl chloride or a copolymer of vinyl chloride having a high bulk density by the suspension polymerization of vinyl chloride alone or a mixture consisting predominantly of vinyl chloride and at least one monomer copolymerizable therewith in the presence of an oil soluble catalyst which comprises initiating the polymerization reaction in the presence of (1) a partially saponified polyvinyl acetate having a degree of saponification of 70 to 80 mol % and an average degree of polymerization of 500 to 900 as a suspension stabilizer and in the presence of said oil soluble catalyst, and when the polymerization conversion reaches 3 to 40% by weight, adding (2) a partially saponified polyvinyl acetate having a degree of saponification of 75 to 95 mol % and an average degree of polymerization of 1000 or more to the polymerization system.

2. The method according to claim 1, wherein the partially saponified polyvinyl acetate having a degree of saponification of 70 to 80 mol % and an average degree of polymerization of 500 to 900 is used in an Table III

| Test No. | Bulk density (g/cc) | Gelling time (minute) | Particle size distribution | | |
|---|---|---|---|---|---|
| | | | 42 mesh pass | 100 mesh pass | 250 mesh pass |
| 10 | 0.51 | 3.8 | 98.5 | 10.3 | 0.0 |
| Comp. 10 | 0.46 | 4.3 | 98.8 | 12.1 | 0.1 |

EXAMPLE 4

Extrusion tests of the polymers obtained by the Examples and Comparative Examples shown hereinbefore were performed. Polymer (100 parts by weight), tribase (3 parts by weight) and stearic acid (2 parts by weight) were blended for 20 minutes by a ribbon blender. The resultant mixture was extruded in a form of a pipe having an outside diameter of 45 mmφ at 20 amount of 0.01 to 0.2 part by weight on the basis of 100 parts by weight of the monomer and the partially saponified polyvinyl acetate having a degree of saponification of 75 to 95 mol % and an average degree of polymerization of 1000 or more is used in an amount of 0.01 or more part by weight on the basis of 100 parts by weight of the monomer.

3. The method according to claim 2, wherein both of the partially saponified polyvinyl acetates are used in a weight ratio of 1 : 10 to 10 : 1 and the total amount of both of the partially saponified polyvinyl acetate is in a range of 0.03 to 0.3 part by weight on the basis of 100 parts by weight of the monomer.

4. The method according to claim 1, wherein the monomer copolymerizable with vinyl chloride is a member selected from the group consisting of ethylene, propylene, vinyl acetate, vinyl propionate, lauryl vinyl ether, isobutyl vinyl ether, methyl acrylate, methyl methacrylate, ethyl acrylate, butyl acrylate and octyl acrylate.

5. The method according to claim 1, wherein the polymerization reaction is conducted in the presence of from 0.005 to 1% by weight of said oil soluble catalyst at a temperature of from 20° to 70°C.

6. The method according to claim 1, wherein the proportion of water to the monomer to be polymerized is employed in a range of 0.8 to 2.0 parts by weight on the basis of 1 part by weight of the starting monomer.

7. The method according to claim 5, wherein said oil soluble catalyst is selected from the group consisting of lauroyl peroxide, t-butyl peroxypivalate, diisopropyl peroxydicarbonate, di-sec.-butyl peroxydicarbonate, azobisisobutyronitrile, azobis (2,4-dimethylvaleronitrile), azobis(2,4-dimethyl-4-methoxyvaleronitrile and mixtures thereof.

8. The method according to claim 1, wherein the partially saponified polyvinyl acetate (2) added to the polymerization system has an average degree of polymerization of 1000 to 3000.

* * * * *